United States Patent Office 3,081,140
Patented Mar. 12, 1963

3,081,140
PROCESS FOR COLORING POLYVINYL MATERIALS
John Ford, 8841 Orangewood Ave., Anaheim, Calif.
No Drawing. Filed Oct. 21, 1958, Ser. No. 768,545
7 Claims. (Cl. 8—4)

This invention relates generally to a composition of matter and process for coloring specific areas of plastic materials, and more specifically relates to a composition of matter and process for permanently striping polyvinyl materials such as a polyvinyl coated electric wire or cable.

Polyvinyl (PV) coatings in general and polyvinylchloride (PVC) compounds, specifically, have been employed in the past as coverings or coatings for conductors. In general, such coatings are both highly insulative and chemically resistant. In solidly coloring or color-coding polyvinyl coated electric conductors relatively few problems arise, one of many suitable plastic compatible dyes being merely intermixed into the particular resin employed as the insulator prior to the actual coating of the cable. It is frequently desireable however to utilize a color-coded cable having a striped or other distinctive pattern. In the past, attempts at providing striped polyvinyl materials usually resulted in a spreading or diffusion of the color from the striped area onto the uncolored areas of the plastic material. Identification by means of the striping after the material had aged for a period of several months was difficult or impossible.

In view of the foregoing facts, it is a major object of the present invention to provide a composition of matter and process for coloring specific areas of solid material without diffusion of the colored area into the uncolored area.

It is another object of the present invention to provide a composition of matter and process for coloring specific areas of a solid polyvinyl material wherein the penetration and movement of the coloring matter within the composition is substantially completely stabilized and controlled by certain active compounds contained in the coloring composition so that upon application of the composition of matter to a specfic area, the color does not diffuse therefrom.

A further object of the invention is to provide a coloring composition of matter for coloring polyvinyl materials which has a high rate of evaporation so that the size of drying equipment required, if any, can be held to a minimum.

Yet a further object of the present invention is to provide a coloring composition of matter which has high resistance to heat and which, after application to a polyvinyl material, has a high resistance to smearing or mechanical handling.

These and other objects of the invention will become clearly understood by referring to the following detailed description.

In general, my coloring composition of matter, or ink, comprises a dye for example, of the azo, cyanine or phthalocyanine type, and a stabilizing or "diffusion-inhibiting" compound selected from the group of compounds known collectively as the Freons—more specifically, those fluorinated hydrocarbons having a low boiling point ranging from between 50° F. and 200° F. are preferred. The most preferred Freons are found to reside in the class of fluorochlorinated or fluorobrominated methanes or ethanes having a normal boiling point ranging from between approximately 50° F. and approximately 200° F.

In utilizing PVC coatings for electrical conductors high molecular weight PVC resinous coatings are preferred because they have a lower flammability than the low molecular covering. A typical PVC covering which will withstand 220° F. temperatures without adverse effects is as follows:

| | Parts |
|---|---|
| High molecular weight PVC resin | 50 |
| Plasticizer, e.g. dioctylphthalate | 35 |
| Stabilizers: | |
| Light-phosphate type | 1.0 |
| Heat-lead type | 4.0 |
| Filler, e.g., calcium carbonate | 9.0 |
| Lubricant | 1.0 |
| Total | 100.0 |

The PV covering may be extruded directly onto bare electrical wire conductor or may be extruded, or otherwise applied, to a precoated wire. The precoated materials are of dissimilar plastic compositions, such as, for example, polyethylene, nylon and Teflon (tetrafluoroethylene).

In preparing the ink, a PV penetrant, softener or solvent (these terms being covered herein generically by the term PV solvent), preferably tetrahydrofuran (THF) is first intermixed with the desired Freon or Freons. Then a desired PV-compatible dye is added to this base material to make a stable dispersion or solution. The dispersion or solution is then applied to the PV material in the desired configuration, the THF dissolving the PV material permitting penetration of the dye into the PV coating. The Freon or Freons acts as a diffusion-inhibiting means, as previously discussed.

Specific examples of the Freons that have been successfully employed either singly, or in combination, in my composition of matter are:

(1) Trichloromonofluoromethane
(2) Trichlorotrifluoroethane
(3) Tetrachlorodifluoromethane
(4) Dibromodifluoromethane
(5) Dibromomonochlorotrifluoroethane
(6) Dibromotetrafluoroethane As mentioned, the dyes employed may for example, be of the azo type, phthalocyanine or cyanine type. Further, it is found that any of the conventional polyvinyl-compatible dye compounds which are stable at the temperatures contemplated, that is between 50° F. and 200° F., may be employed. A polyvinyl-compatible dye is defined for the purpose of this specification and claims as a dye which is capable of imparting its color to polyvinyl plastic materials. Examples of the various types of dyes that can be employed are listed below:

(1) Nigrosine dyes sold under the trademark "Calco-"; that is, Colour Index Nos. 50415, 50415B, and 50420.

(2) Azo dyes sold under the trademark "Anthosine," that is, C.I. Acid Red 110, Colour Index No. 18020; C.I. Acid Red 108, having Colour Index No. 18000; and C.I. Acid Red 107, having Colour Index No. 18025.

The above Colour Index Nos. are those appearing in Colour Index, 2d edition, 1956. This publication gives chemical formulas and general methods of preparing and using specific dyes. For instance, the principal Anthosine dyes are very closely related chemically, as shown by the following formulas, appearing at pages 3104 and 3105 of the Colour Index, 1956.

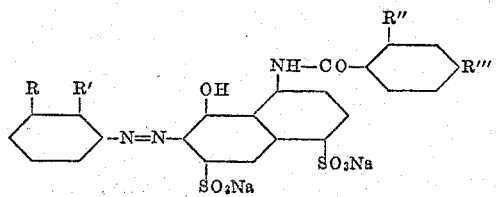

where (1) R is —CH₃ and R', R", and R''' are —H for C.I. No. 18000
(2) R, R", and R''' are —Cl and R' is —H for C.I. No. 18020; and
(3) R is —H, R' is —OCH₃, and R" and R''' are —Cl for C.I. No. 18025.

As indicated above, other conventional dyes for polyvinyl materials are useful.

The designation R in a circle denotes a registered trademark.

Specific examples of the base solvent or base carrying medium to which the dye is added are listed below:

*Example I*

| | Parts by weight |
|---|---|
| Tetrahydrofuran | 50 |
| Trichloromonofluoromethane | 50 |
| | 100 |

*Example II*

| | |
|---|---|
| Tetrahydrofuran | 80 |
| Trichlorotrifluoroethane | 20 |
| | 100 |

*Example IIa*

| | |
|---|---|
| Tetrahydrofuran | 75 |
| 1:1 mixture of trichloromonofluoromethane and trichlorotrifluoroethane | 25 |
| | 100 |

*Example III*

| | |
|---|---|
| Tetrahydrofuran | 30 |
| Dibromotetrafluoroethane | 70 |
| | 100 |

To each of the above solvents or dispersing media listed above (the base medium being sometimes referred to hereinafter, and in the claims, as the base solvent regardless of whether it acts as a dispersing medium or as a true solvent medium) sufficient dye material is added to preferably saturate the base solvent or to form a stable dispersion with a maximum amount of dye. This coloring composition of matter or ink is then applied to the polyvinyl material, e.g. polyvinylchloride, in any desired pattern, e.g. in a striping configuration, by conventional equipment. The ink penetrates the PVC coating because of the action of the THF thereon, and the dye is thereby carried into the coating. The Freons in the composition of matter, on the other hand, inhibit or halt completely, the penetration of the dye outwardly, i.e. inhibit substantially completely the usual tendency of the dye to diffuse into the uncolored areas of the plastic coating upon aging.

The preferable limits of THF in the base of the ink varies between 20 to 90 parts by weight of the total THF and Freon constituents combined. The preferable limits of the Freon constituent or constituents range between 10 and 80 parts by weight of the total THF and Freon constituents combined.

It is sometimes found desirable to insure an even greater bonding between the ink composition above described and the PV material coating to which it is applied by incorporating into the ink composition a small amount of PV material such as PVC or polyvinylacetate. Thus, Examples I, II and III may be modified as indicated below in Examples IV, V and VI respectively:

*Example IV*

| | Parts by weight |
|---|---|
| THF | 55 |
| Trichloromonofluoromethane | 38 |
| PVC | 7 |
| | 100 |

*Example V*

| | |
|---|---|
| THF | 85 |
| Trichlorotrifluoroethane | 12 |
| Polyvinylacetate (PVA) | 3 |
| | 100 |

*Example VI*

| | |
|---|---|
| THF | 30 |
| Dibromotetrafluoroethane | 69 |
| PVC | 1 |
| | 100 |

The preferable limits by weight of PVC or PVA in this ink vary between 1 to 7% by weight based on the total weight of THF, Freons and PVC or PVA combined. The dye is then added to the ink to make preferably a saturated solution or stable dispersion having a maximum amount of dye material.

It is also found that the addition of small amounts of certain other plastic compounds increases both heat resistance to smearing and mechanical handling of the colored areas. These other plastic compounds are preferably a combination of the phenolic resin type and epoxy type, although either type may be used singly. The phenolformaldehyde type of phenolics can be employed, and in the epoxy groupings, any of the epoxy resins sold under the trademark "Epon"® can be employed.

Specific examples of this modified ink composition are given below:

*Example VII*

| | Parts by weight |
|---|---|
| THF | 60 |
| Trichlorotrifluoroethane | 30 |
| Phenolic resin | 7 |
| Epoxide resin | 0.5 |
| PVC | 2.5 |
| | 100 |

*Example VIII*

| | |
|---|---|
| THF | 70 |
| Dibromomonochlorotrifluorethane | 25 |
| Phenolic resin | 3 |
| PVC | 7 |
| | 100 |

*Example IX*

| | |
|---|---|
| THF | 65 |
| Dibromotetrafluoroethane | 30 |
| Epoxy resin | 1 |
| PVC | 4 |
| | 100 |

*Example X*

| | |
|---|---|
| THF | 20–80 |
| Trichloromonofluoromethane or trichlorotrifluoroethane or a mixture of both | 10–80 |
| Phenolic resin | 0.5–7.5 |
| Epoxide resin | 0.05–1.0 |
| Polyvinylchloride resin | 1–7 |

To make 100 parts.

The preferred amount of phenolic and epoxy resins varies between 0.5 to 7.5% and 0.05 to 1% by weight respectively of the base solvent, exclusive of the dye. The amounts of the different dyes are preferably added to the above base solvents until a saturated solution is produced, or if the dye is not soluble therein, until a stable dispersion having a maximum amount of dye is produced.

While several embodiments of my invention have been described herein, it will be evident that modifications and changes can be made that lie within the skill of a worker in the art. The scope of my invention, therefore, is set forth in the appended claims.

I claim:

1. In a process for coloring solid polyvinylchloride material with a dye, the improvement which comprises applying to said solid polyvinylchloride a composition containing a dye for said polyvinylchloride, said dye being contained in a solvent consisting essentially of tetrahydrofuran and a fluorinated compound selected from the group consisting of fluorochlorinated and fluorobrominated methanes and ethanes having a normal boiling point between about 50° F. and 200° F.

2. The process of claim 1 wherein said solvent comprises, by weight, 20–90 parts of tetrahydrofuran and 10–80 parts of said fluorinated compound.

3. The process of claim 1 wherein the fluorinated compound includes trichloromonofluoromethane.

4. The process of claim 1 wherein the fluorinated compound includes trichlorotrifluoroethane.

5. The process of claim 1 wherein the fluorinated compound includes dichlorodifluoroethane.

6. The process of claim 1 wherein the fluorinated compound includes dibromodifluoromethane.

7. The process of claim 1 wherein the fluorinated compound includes dibromotetrafluoroethane.

References Cited in the file of this patent

UNITED STATES PATENTS

| | | |
|---|---|---|
| 2,659,704 | Kerr | Nov. 17, 1953 |
| 2,758,104 | Adelman | Aug. 7, 1956 |
| 2,894,928 | Hohnstine | July 14, 1959 |